(12) United States Patent
Lahav et al.

(10) Patent No.: US 7,106,968 B2
(45) Date of Patent: Sep. 12, 2006

(54) COMBINED SONET/SDH AND OTN ARCHITECTURE

(75) Inventors: Danny Lahav, Kfar Saba (IL); Haim Moshe, Petach-Tikva (IL); Arie Menscher, Shoham (IL); Aryeh Lezerovitz, Tel Aviv (IL)

(73) Assignee: Optix Networks Inc., Weston, MA (US)

(*) Notice: Subject to any disclaimer, the term of this patent is extended or adjusted under 35 U.S.C. 154(b) by 738 days.

(21) Appl. No.: 10/189,560

(22) Filed: Jul. 8, 2002

(65) Prior Publication Data

US 2003/0120799 A1  Jun. 26, 2003

Related U.S. Application Data

(60) Provisional application No. 60/303,070, filed on Jul. 6, 2001.

(51) Int. Cl.
  *H04J 14/00* (2006.01)
(52) U.S. Cl. .............................. 398/47; 398/68; 398/74; 398/135
(58) Field of Classification Search ...................... None
  See application file for complete search history.

(56) References Cited

U.S. PATENT DOCUMENTS

| | | | | |
|---|---|---|---|---|
| 6,058,119 | A * | 5/2000 | Engbersen et al. | 370/466 |
| 6,272,130 | B1 * | 8/2001 | Panahi et al. | 370/366 |
| 6,584,535 | B1 * | 6/2003 | Ouellet et al. | 710/305 |
| 6,628,725 | B1 * | 9/2003 | Adam et al. | 375/259 |
| 6,717,953 | B1 * | 4/2004 | Heuer et al. | 370/466 |
| 6,765,928 | B1 * | 7/2004 | Sethuram et al. | 370/476 |
| 6,822,956 | B1 * | 11/2004 | Coltro | 370/389 |
| 6,888,846 | B1 * | 5/2005 | Shraga et al. | 370/466 |
| 6,930,512 | B1 * | 8/2005 | Yin | 326/54 |
| 6,944,190 | B1 * | 9/2005 | Tomar et al. | 370/535 |
| 6,956,847 | B1 * | 10/2005 | Heston et al. | 370/353 |
| 2001/0015980 | A1 * | 8/2001 | Ramfelt et al. | 370/404 |
| 2003/0081596 | A1 * | 5/2003 | Kikidis et al. | 370/356 |

OTHER PUBLICATIONS

Intel IXF30005, Digital Wrapper for 10Gbit/s Optical Transport Network (OTN), Jun. 2001, http://www.archive.org.*

(Continued)

*Primary Examiner*—Zarni Maung
*Assistant Examiner*—Van Kim T. Nguyen
(74) *Attorney, Agent, or Firm*—Mark M. Friedman (57) ABSTRACT

Architecture for efficient processing of the evolving OTN transmission technology, standardized under ITU-T G.709, in conjunction with existing and emerging SONET/SDH protocol signals, standardized under ANSI T1.105/ITU-T G.707. The new architecture allows processing the SONET/SDH signals, and/or OTN signals, and/or SONET/SDH mapped into OTN signals more efficiently. The architecture further allows processing and multiplexing of lower order signals into a higher order signal such as quad OC-192 into OC-768 or quad OC-192 into OPU3 and OTU3. This architecture uses an embedded processor to process some of the signals' overhead in software, contributing to an additional level of flexibility in the processing. This architecture enables customization and allowing for future standard updates and upgrades. The architecture can be upgraded to SONET OC-3072, SDH STM-1024 and OTU4, which currently are not standardized. The architecture can also be used for the implementation of SONET OC-192 with OTN OTU2.

31 Claims, 7 Drawing Sheets

OTHER PUBLICATIONS

Intel Integrated Solution for STM16/)C-48 Network Element with Forward Error Correction, Utilizing IXF30005 Device and GD16523/GD16524 Chipset, Jun. 2001, http://www.archive.org.*

Intel OTN/G.709 Optical Transport Network Node Interface (ONNI) Elements and Interconnects, Utilizing IXF30005 and LXT16742/43, Jun. 2001, http://www.archive.org.*

Networking & Communications Building Blocks, Intel IXF30005 Digital Wrapper 10Gbit/s OTN, pp. 1-3, http://www.archive.org.*

ITU-T G.709 (Oct. 2001) Series G. Transmission Systems and Media Digital Systems and Networks "Network Node Interface For Optical Transport Network (OTN)" Standard.

ITU-T G.975 (Nov. 1996) Series G. Transmission Systems and Media Digital Systems and Networks "Forward error correction for submarine systems" Standard.

* cited by examiner

Figure 1A

| | Column number | | | |
|---|---|---|---|---|
| | 1———14 | 15——16 | 17———3824 | 3825——4088 |
| R O W | 1 | OTU/ODU Overhead | OPU Overhead | Payload Area | FEC Area |
| | 2 | | | | |
| | 3 | | | | |
| | 4 | | | | |

Figure 1B

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | | | | FAS | | | MFAS | OTU-SM | | | OTU-GCC0 | | RES | CS | CS |
| 2 | ODU-RES | | | TCM ACT | ODU-TCM6 | | ODU-TCM5 | | ODU-TCM4 | | | ODU-FTFL | CS | CS |
| 3 | ODU-TCM3 | | ODU-TCM2 | | ODU-TCM1 | | ODU-PM | | ODU-EXP | CS | CS |
| 4 | ODU-GCC1 | ODU-GCC2 | | ODU-APS/PCC | | | ODU-RES | | | PSI | CS |

COMBINED SONET/SDH AND OTN ARCHITECTURE

This application is an application filed under 35 U.S.C. § 111(a), claiming benefit pursuant to 35 U.S.C. § 120 of the filing date of the Provisional Application Ser. No. 60/303,070 filed on Jul. 6, 2001, pursuant to 35 U.S.C. § 111(b). The Provisional Application Ser. No. 60/303,070 is incorporated herein by reference for all it discloses.

REFERENCES CITED

ITU-T G.709"Network Node Interface for optical transport network (OTN)" standard (see: http://www.itu.int/ITU-T/).
ITU-T G.975 "Forward error correction for submarine systems" standard (see: http://www.itu.int/ITU-T/).

FIELD OF THE INVENTION

The present invention relates to integrated circuits for network devices and systems, and more particularly to architecture and data flow for efficient processing of SONET/SDH and OTN signals in a plurality of combinations.

BACKGROUND OF THE INVENTION

SONET is a standard for optical transport formulated by the Exchange Carriers Standards Association (ECSA) for the American National Standards Institute (ANSI), which sets industry standards in the U.S. for telecommunications and other industries. The standard has also been incorporated into the Synchronous Digital Hierarchy recommendations of the Consultative Committee on International Telegraph and Telephone (CCITT) (now called the International Telecommunications Union [ITU]), which sets standards for international telecommunications. Synchronous Optical Network (SONET) and Synchronous Digital hierarchy (SDH) (hereinafter referred to as "SONET/SDH) are now mature digital transport technologies, established in virtually every country in the world. When SONET/SDH was first conceived in the early 1980s, telecommunications traffic was predominantly voice. During the last years there has been a burst in the demand for bandwidth driven mainly by Internet access, e-commerce and mobile telephony. This increase in demand has, so far, been primarily satisfied through a combination of time division multiplexing (TDM), which enables transmission of multiple signals simultaneously over a single transmission path, and dense wave division multiplexing (DWDM), wherein multiple wavelengths are transmitted through a single fiber. However, as the network evolves to higher line rates, the physical limitations of the transport medium (optical fiber) become critical. Furthermore, there remains an overriding requirement to control the cost of providing and improving the level of service to the users.

Optical transport network (OTN) was conceived in 2001, under the auspices of the International Telecommunication Union (ITU) (http://www.itu.int/ITU-T/), to overcome the drawbacks of SONET/SDH. The OTN capabilities and facilities are published as a new standard, known as ITU-G.709 "Network node interface for the optical transport network (OTN)", which is fully incorporated herein by reference, as if fully set forth herein. The OTN standard is based on the G.975 standard, however, some key elements have been added to improve performance and reduce cost. These include management of optical channels in the optical domain, forward error correction (FEC), to improve error performance and enable longer optical spans, and a standardized method for managing optical wavelengths (channels) end to end without the need for processing of the payload signal.

Figure 1A:
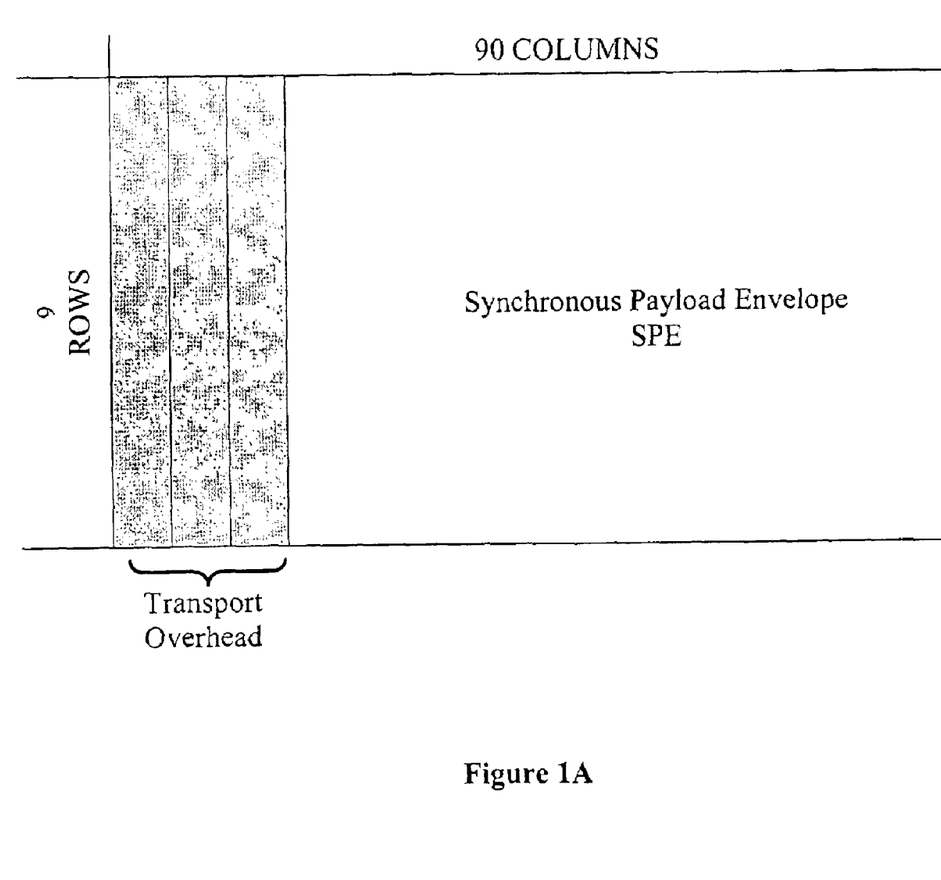
FIG. 1 is an illustration of typical SONET/SDH and OTN frame structures.

Reference is now made to FIG. 1A where an illustration of a typical SONET/SDH frame is shown. A SONET frame as defined, for example in the ANSI T1.105, and G.707 for SDH standards, may be thought of as a two-dimensional array of bytes, or a data block, having a length and a width. The length and width are referred to as rows and columns. Each frame includes nine rows and ninety columns (9×90). The first three columns are used for overhead management of the SONET/SDH frame. The other columns provide a synchronous payload envelope (SPE). SPE carries the information that must traverse the entry and exit points through the SONET/SDH network. This information includes both the payload traffic and the path overhead. The path overhead coordinates the activities between the SONET terminals (or add/drop multiplexors) that are responsible for the entry and exit points through the network. The SONET frame is a synchronized frame, the beginning of which may be indicated by a frame signal. This frame format is used for all SONET/SDH transmissions. As the data rates increase, more copies of the frames are transmitted for each transmission period. Typically, SONET/SDH frames are wrapped with a digital wrapper used for error detection and correction. Error correction is performed, as defined in the G.975 standard, with a wide range of applications in digital communications, by means of the well known in the art Reed-Solomon algorithm (see http://www.itu.int/ITU-T/). SONET/SDH protocols are capable of handling two different types of flows: a) time division multiplexing (TDM); and, b) flows that contain data packets, such as IP, ATM, GFP, 1GBE and 10GBE. TDM is typically used for telecom applications. The frame shown in FIG. 1A typically refers to STS-1, which is the basic frame for the SONET, or to STM-0, which is the equivalent of SDH.

Figure 1B:
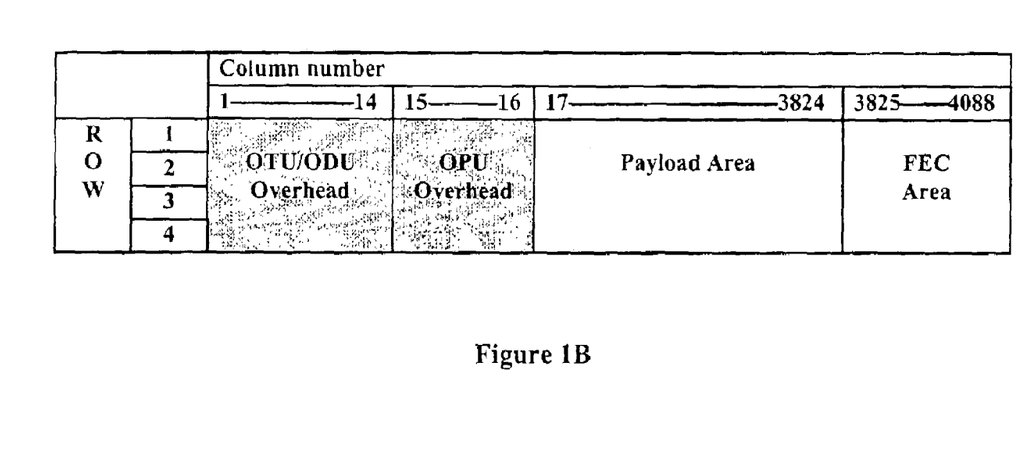

Reference is now made to FIG. 1B where an illustration of an OTN frame is shown. An OTN frame consists of three distinct parts, two of which that are broadly similar to the SONET/SDH frame, namely an overhead area and a payload area. In addition, the OTN frame includes a forward error control (FEC) area. The FEC scheme used in the OTN is a Reed-Solomon RS (255,239) code. This means that for every 239 bytes of data, an additional 16 bytes of data (code words) are added for the purpose of error correction. These additional bytes, when used for error correction in data flows, can enable correction of 8 symbol errors in the FEC code word (FEC section in the OTN frame). When used for error detection, these additional bytes can enable detection of 16 symbol errors. The size of the OTN frame is four rows of 4080 bytes. Data is transmitted serially beginning at the top left, first row followed by the second row and so on and so forth. There are three line rates currently defined in OTN: 1) 2.5 Gbit/s—optical channel transport unit 1 (OTU1); 2) 10 Gbit/s—optical channel transport unit 2 (OTU2); and, 3) 40 Gbit/s—optical channel transport unit 3 (OTU3). The actual rates of OTU1, OTU2 and OTU3 are 2.66 Gbps, 10.7 Gbps and 43 Gbps respectively. From this point we will refer to the basic rates (i.e. 2.5 Gbps, 10 Gbps and 40 Gbps).

Figure 1C:
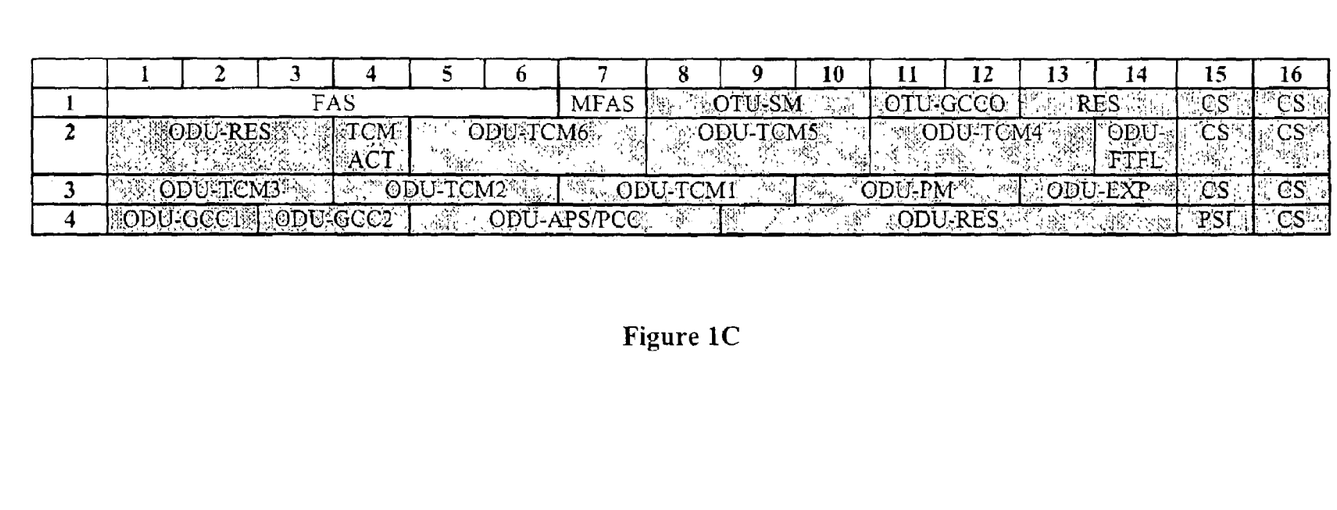

The overhead area includes two sections shown in FIG. 1C. The overhead sections include the optical transport unit (OTU) together with the optical data unit (ODU), i.e., OTU/ODU, and the optical payload unit (OPU). The OTU overhead, located in row 1 columns 8–14, provides supervisory functions such as section monitoring (SM), and general communication channel (GCC0). The ODU overhead is placed in columns 1–14 of rows 2, 3 and 4 of the OTN frame. The ODU information structure provides tandem connection monitoring (TCM), end-to-end path supervision, and client signal adaptation via the optical channel payload unit (OPU). The OPU overhead is added to the OPU payload and contains information to support the adaptation of client signals. The OPU overhead is located in rows 1–4 of columns 15 and 16 and is terminated where the OPU is assembled and disassembled. The frame alignment signal is located at row 1 columns 1–6. A detailed description of the OTN frame is provided in "ITU-T G.709 Interface for optical transport network (OTN)" (http://www.itu.int/ITU-T/), which is fully incorporated herein by reference, as if fully set forth herein.

Figure 2:
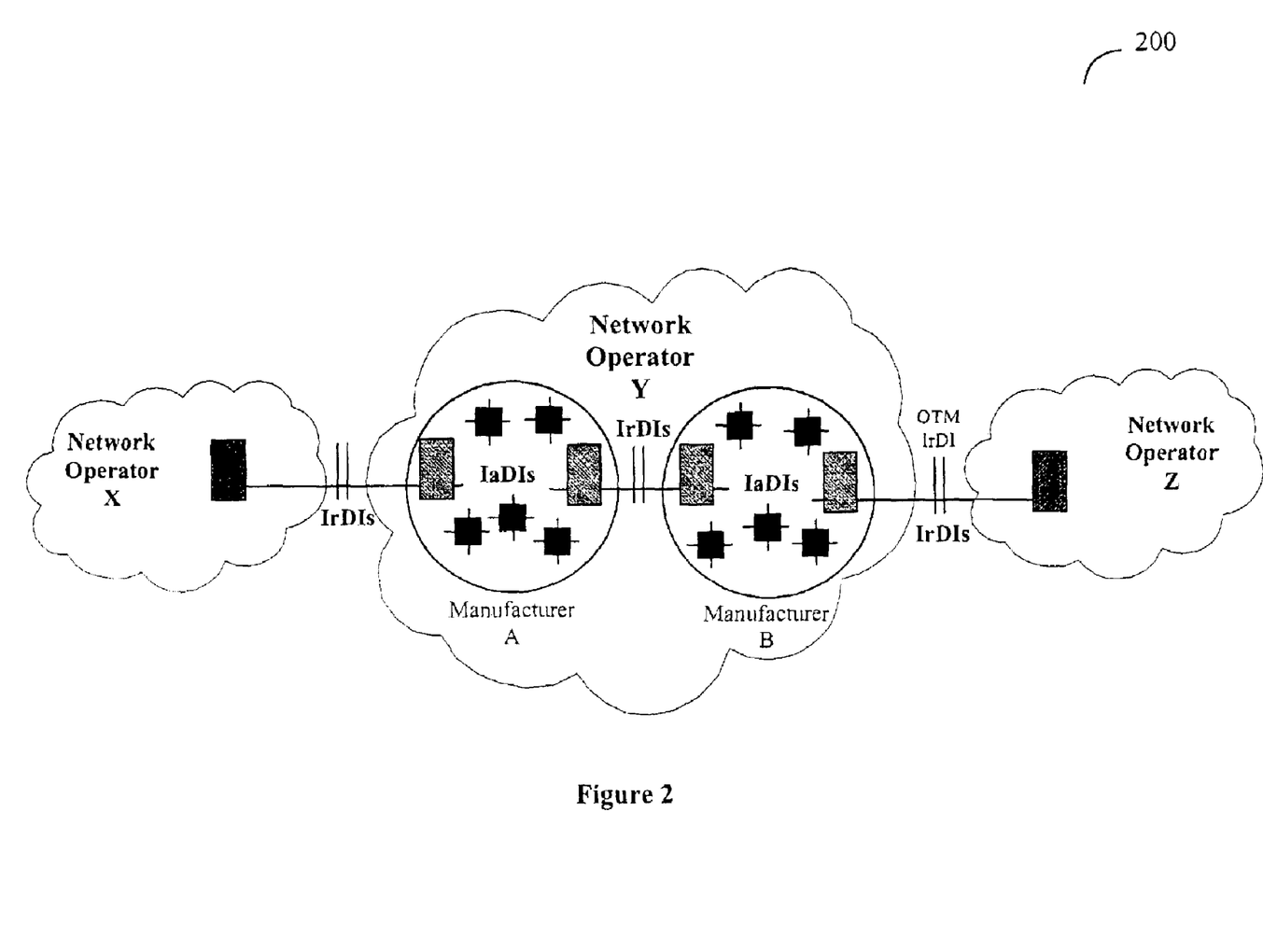
FIG. 2 is an exemplary network that includes IrDI and IaDI interfaces.

Reference is now made to FIG. 2 where an exemplary network 200, that includes OTN sub-network with standard interface IrDI and OTN sub-network with proprietary interface IaDI. Network 200 includes inter-domain interfaces (IrDIs) 210, and intradomain interfaces (IaDIs) 220. IrDIs 210 are the boundaries between OTNs of different administrative domains. The administrative domains may be that of multiple network operators and/or equipment vendors. IrDIs 210 may be used as interfaces between different networks or between different IaDIs 220 within the same network operator. IaDIs 220 may be any interface within a single vendor sub-network, which may or may not extend to include the entire carriers. IaDIs 220 are not part of the OTN standardization except for properties necessary for network management. Hence, IaDIs may not necessarily be compliant with the OTN standard. This non-compliance may result in significant limitations when incorporating Intra-corporate networks (which are SONET based optic networks) into Optical data networks that are OTN based. Currently such hybrid networks therefore require significant investment in complex interface design in order to run such a network effectively. Network 200 is an example of such a network.

Due to the complexity of the interfaces described hereinabove, there is a widely recognized need for, and it would be highly advantageous to have, a solution that provides an efficient data flow in networks comprised of a variety of sub-networks and interfaces, including both inter and intra domain interfaces, that are compliant with different standards, for example, networks that combine SONET/SDH and OTN standards.

SUMMARY OF THE PRESENT INVENTION

The present invention relates to new device architecture that enables effective setting up and maintaining of optical data networks that combine the SONET/SDH protocol (standard) with the emerging OTN G.709 standard. The flow of data between the building blocks of the device architecture allows several configurations of SONET/SDH and OTN in a network, and a variety of combinations of SONET/SDH and OTN.

The building blocks of the architecture of the present invention (which comprise the integrated architecture or apparatus) are: OTN OTU3 (hereinafter "OTN SYS"), SONET/SDH OC-768/STM-256 (hereinafter "SONET SYS"), Quad OTU2, Quad SONET/SDH OC-192/STM-64 (hereinafter "Quad SONET"), processor, and a plurality of internal multiplexors (hereinafter "MUX"). In addition, the integrated architecture typically has a line interface for receiving and transmitting OTN and SONET signals between the architecture and external network devices, and a system interface for receiving and transmitting OTN and SONET signals between the architecture and management devices. The integrated architecture may provide the following combinations of the building blocks: OTN SYS and SONET SYS; OTN SYS and QUAD SONET; Quad OTU2 and SONET SYS; and Quad OTU2 and Quad SONET, and any combination thereof. Hereinafter, and in the claims, all references to "SONET" transmission system and standard also refer to Synchronous Digital Hierarchy (SDH) transmission system.

The present invention operates according to the following primary method, in the case where OTN type data is received by a SONET type network device (a similar method, without the error detection/correction process, can be used for the case wherein SONET type data is received by an OTN type network device):

i. Data from an external network is transmitted as a serial stream and received as a parallel stream, by means of a serializer/deserialzer (SERDES).

ii. A framer component performs frame alignment to identify the beginning of each OTN frame.

iii. A scrambler/descrambler component scrambles or descrambles the OTN signals (i.e. frames) to guarantee transition of the signal.

iv. A FEC component is used for error detection/correction of the incoming signals, by means of the Reed Solomon algorithm RS (255,239).

v. An OHP component is used to process the information encapsulated in the OTU/ODU/OPU overhead. In addition, the OHP block is used to build the OTU/ODU/OPU overloads in the transmit direction.

vi. The mapper component primarily converts the incoming OTN signals into SONET/SDH signals, and can likewise handle the mapping of SONET/SDH signals into OTN signals. The mapper component can additionally handle payloads configured as data type applications. A data buffer, which is part of the mapper component, is used for rate adaptation. Data engines, which are also part of the mapper component, are used to extract the data information from the encapsulated payload such as GFP for IP packets or SONET signals, and insert it into the output buffer. From the output buffer the data is sent to other component for further processing.

vii. A mux/demux component is used for multiplexing the TDM payload from quad OTU2 or OC-192/STM-64 signals to OTU3 signals, and additionally, the mux/demux component is capable of (emultiplexing an OTU3 signal to four OTU2 or OC-192/STM-64 signals.

The integrated architecture allows the handling of a variety of data flows that are compliant with SONET/SDH OC-768/STM-256 standard, OTN OTU3 standard, SONET/SDH OC-192/STM-64 standard, OTN OTU2 standard, SONET OC-3072, SDH STM-1024 standard, OTU4 standard, and any of the combinations thereof.

A first example of the integrated architecture, according to the present invention, describes the processing of OTN OTU3 signals.

A second example of the integrated architecture, according to the present invention, describes the processing for SONET/SDH OC-768/STM-256 mapped for OTN OTU3 processing.

A third example of the integrated architecture, according to the present invention, describes the processing for Quad channels of OC-192/STM-64 mapped into OTU2 processing.

BRIEF DESCRIPTION OF THE DRAWINGS

The principles and operation of a system and a method according to the present invention may be better understood with reference to the drawings, and the following description, it being understood that these drawings are given for illustrative purposes only and are not meant to be limiting, wherein.

DETAILED DESCRIPTION OF THE INVENTION

The present invention provides an integrated SONET/SDH and OTN architecture (hereinafter "integrated architecture" or "apparatus") targeted for efficient data now between optical networks devices that receive and/or transmit data using non-compatible standards. Specifically, the provided integrated architecture enables the receipt of SONET/SDH flows and adapts them to OTN flows, and vice versa. The provided architecture supports the following protocols: SONET/SDH OC-768/STM-256, OC-192/STM-64, OTN OTU3, and OTU2, SONET OC-3072, SDH STM-1024, OTU4 and can be configured to support various alternative protocols based on the same principles as the current SONET/SDH and OTN flows.

The following description is presented to enable one of ordinary skill in the art to make and use the invention as provided in the context of a particular application and its requirements Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
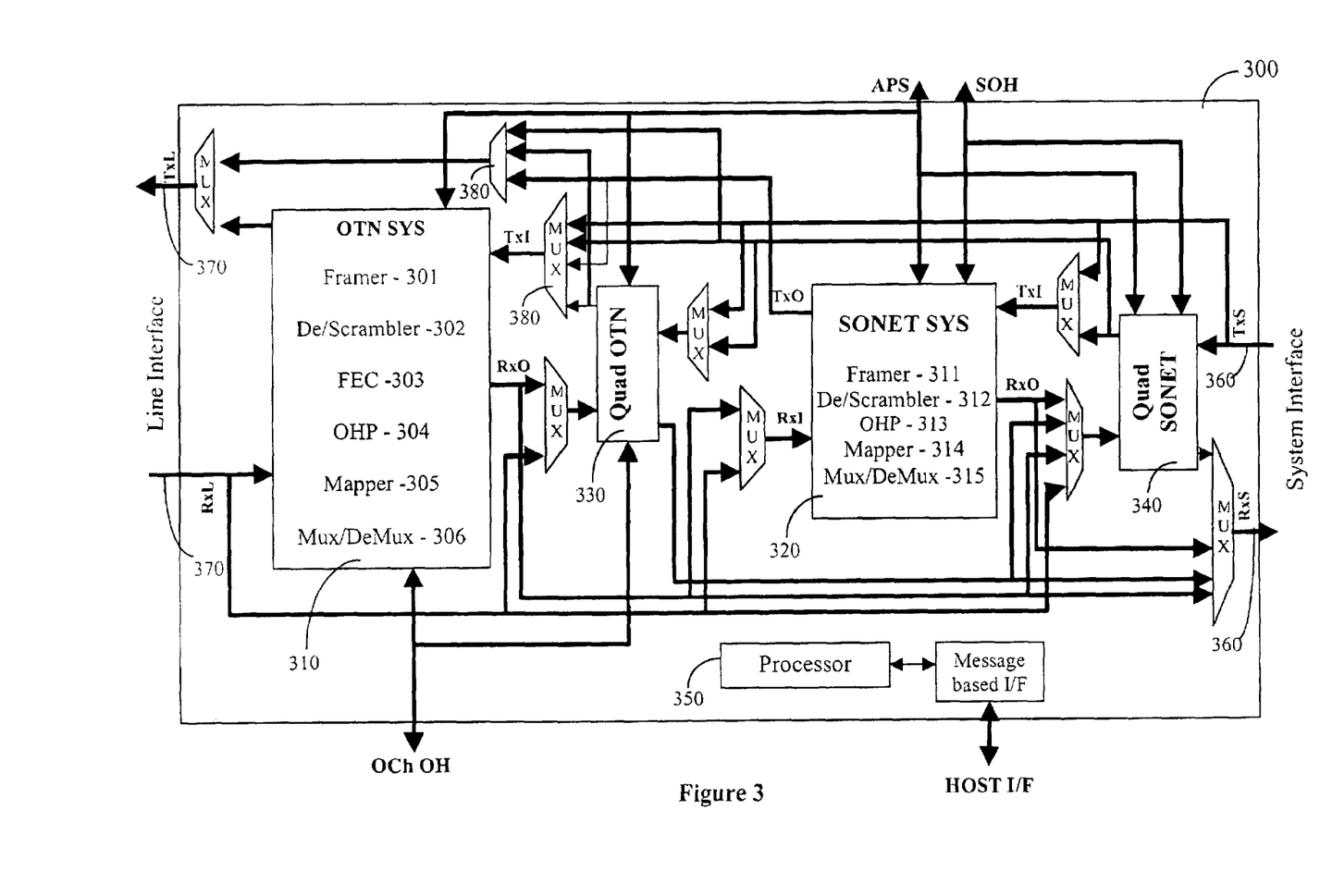
FIG. 3 is an illustration of a block diagram of the integrated architecture according to the present invention.

The principles and operation of a system and a method according to the present invention may be better understood with reference to the drawings and the accompanying description, it being understood that these drawings are given for illustrative purposes only and are not meant to be limiting, wherein:

Reference is now made to FIG. 3 where an exemplary integrated architecture (apparatus) 300 is shown, according to the present invention. Integrated architecture 300 is composed of the following components or blocks: OTN OTU3 (hereinafter "OTN SYS") 310, SONET/SDH OC-768/STM-256 (hereinafter "SONET SYS") 320, Quad OTU2 330, Quad SONET/SDH OC-192/STM-64 (hereinafter "Quad SONET") 340. In addition, the integrated architecture includes a processor 350 for propagating errors, alarms, and messages etc., acquired during the frames processing, to external devises (e.g. host servers), and a plurality of internal multiplexors 380, for enabling transmission of multiple signals over single channels, by selecting the active bus to be connected to the designated component in the Integrated architecture 300. Integrated architecture 300 interfaces with external network devices using a line interface 370, and with internal/management devices) using a system interface 360. The management devices are used to extract and process valuable data that resides in the OTN and SONET/SDH frames. These systems include but are not limited to network processors, packet processors, DSP processors etc. The management devises are connected to other apparatuses 300. The integrated architecture may provide the following combinations of the building blocks: OTN SYS and SONET SYS; OTN SYS and QUAD SONET: Quad OTU2 and SONET SYS; and Quad OTU2 and Quad SONET, and any combination thereof.

According to a preferred embodiment of the present invention, data from an external network (in the form of data packets) is transmitted as a serial stream and received as a parallel stream. The conversion of a serial data stream into a parallel data stream, and vice versa, is performed by means of a serializer/deserialzer (SERDES). The functionality of interface 360 can be determined as follows: for 10 Gbits/s data flows the SPI-4/PLI-4 interfaces are used, while for 40 Gbits/s data flows the SPI-5 interface is used. Similarly, for 10 Gbits/s TDM flows a 4×SFI-4 interface (four channels of SFI-4 interface) is used. For 40 Gbits/s TDM flows, SFI-5 interface is used. The functionality of interface 370 can be determined as follows: for 10 Gbits/s flows, a 4×SFI-4 interface is used while for 40 Gbits/s flow, a SFI-5 interface is used.

OTN SYS 310 is capable of handling OTN OTU3 flows, i.e. OTN flows having a rate of 40 Gbit/s (as mentioned earlier, the actual rate is 43 Gbps). OTN SYS 310 comprises a framer block 301, a de/scrambler block 302, a forward error correction (FEC) 303, an overhead processing block (OHP) 304, a mapper block 305, and a mux/demux block 306. These blocks provide means for framing, scrambling, descrambling and error correcting. The way that each of these functions is performed is defined in OTN standard G.709. In addition, the OTN SYS 310 is capable of mapping and multiplexing. The mapping function enables conversion of the incoming OTN signals into SONET/SDH signals, and can likewise handle the mapping of SONET/SDH signals into OTN signals. The multiplexing function enables multiplexing of four OTN OTU2 signals into a OTN OTU3 signal, and demultiplexing a single OTN OTU3 signal into four OTN OTU3 signals.

The framer block 301 enables identification of the frame boundaries for incoming signals, by performing frame alignment. This is necessary for identifying the beginning of the OTN frame.

The scrambler/descrambler block 302 scrambles or descrambles the OTN signals (i.e. frames). Data scrambling is performed to avoid the existence of long streams of "zeros" or "ones", especially, when transmitting data via fiber optics lines. Long streams of "zeros" or "ones" significantly complicate the detection ability on the receiving side.

The FEC block 303 is used for error detection by means of the Reed Solomon algorithm RS (255,239). The FEC block 303 performs the RS algorithm on the data stream and subsequently inserts redundancy bytes in order to detect en-ors in the stream. If the FEC block 303 is configured according to a "bypass mode", the redundancy bytes arc all inserted as zeros.

The OHP 304 is used to process the information encapsulated in the OTU/ODU/OPU overhead. In addition, the OHP block 304 is used to build the OTU/ODU/OPU overheads in the transmit direction.

The mapper block 305 handles payloads configured as data type applications, e.g, IP, ATM, GFP, 1GBE or 10GBE. The mapper block 305 includes data engines and a data buffer. The data buffer is used for rate adaptation Data engines are used to extract the data information from the encapsulated payload such as GFP for IP packets or SONET signals, and insert it into the output buffer. From the output buffer the data is sent to other blocks for further processing. There are several data engines each supporting a specific data type. The mapper block 305 also handles the mapping of SONET/SDH signals into the OTN frame (mapping into the OPU part).

The mux/demux block 306 is used for multiplexing the TDM payload from quad OTU2 or OC-192/STM-64 signal to OTU3, namely multiplexing four 10 Gbit/sec signals to a single 40 Gbit/sec signal. Additionally, the mux/demux block is capable of demultiplexing an OTU3 signal to four OTU2 or OC-192/STM-64 signals.

SONET SYS 320 is currently capable of handling SONET/SDH OC-768/STM-256 flows, i.e. SONET/SDH flows with rate of 40 Gbit/s. SONET SYS 320 comprises the following blocks: a framer block 311, a scrambler/descrambler block 312, an OHP block 313, a mapper block 314, and a mux/demux block 315. These blocks provide means for framing, scrambling, descrambling, overhead processing, and multiplexing/demultiplexing. The functionality of each block is similar to that described for the blocks of OTN SYS 310 (above), however, each block is implemented to comply with the SONET/SDH standards.

Quad OTN 330 has four channels each capable of handling OTN OTU2, i.e. OTN flows having a rate of 10 Gbit/s each. Quad OTN 330 consists of four blocks of OTN OTU2 with functionality same as OTU3 (e.g., OTN SYS 310) but operated at a rate of 10 Gbit/s (OTU 2). Hence, each channel has the same functionally of the OTN SYS 310.

Quad SONET 340 has four channels each capable of handling SONET/SDH flows with rate of 10 Gbit/sec each, i.e. OC-192/STM-64. Quad SONET 340 consists of four blocks of SONET/SDH OC-192/STM-64 with functionality same as OC-768/STM-256 but operated at a rate of 10 Gbit/s. Hence, each channel has the same functionally has SONET SYS 340.

The blocks comprising integrated architecture 300 are connected by use of a plurality of internal buses and multiplexors (MUX) 380. Internal buses and MUX 380 are configured to establish data paths, which define the following data flows:

1) SONET/SDH OC-768/STM-256
2) OTN OTU-3
3) Quad OC-192/STM-64 into SONET/SDH OC-768/STM-256
4) Quad OTU2 into OTN OTU3
5) Quad OC-192/STM-64 into OTN OTU3
4) SONET/SDH OC-768/STM-256 into OTN OTU3
6) Quad OC-192/STM-64 into SONET/SDH OC-768/STM-256 into OTN OTU3
7) Quad OC-192/STM-64
8) Quad OTU2
9) Quad OC-192/STM-64 into Quad OTU2
10) Quad OC-192/STM-64 into Quad OTU2 into OTU3

These data flows, which are enabled by the integrated architecture 300, allow the handling of data that is compliant with SONET/SDH OC-768/STM-256 standard, OTN OTU3 standard, SONET/SDH OC-192/STM-64 standard, OTN OTU2 standard, and any of the combinations thereof.

OTN OTU3 Data Flow

Figure 4:
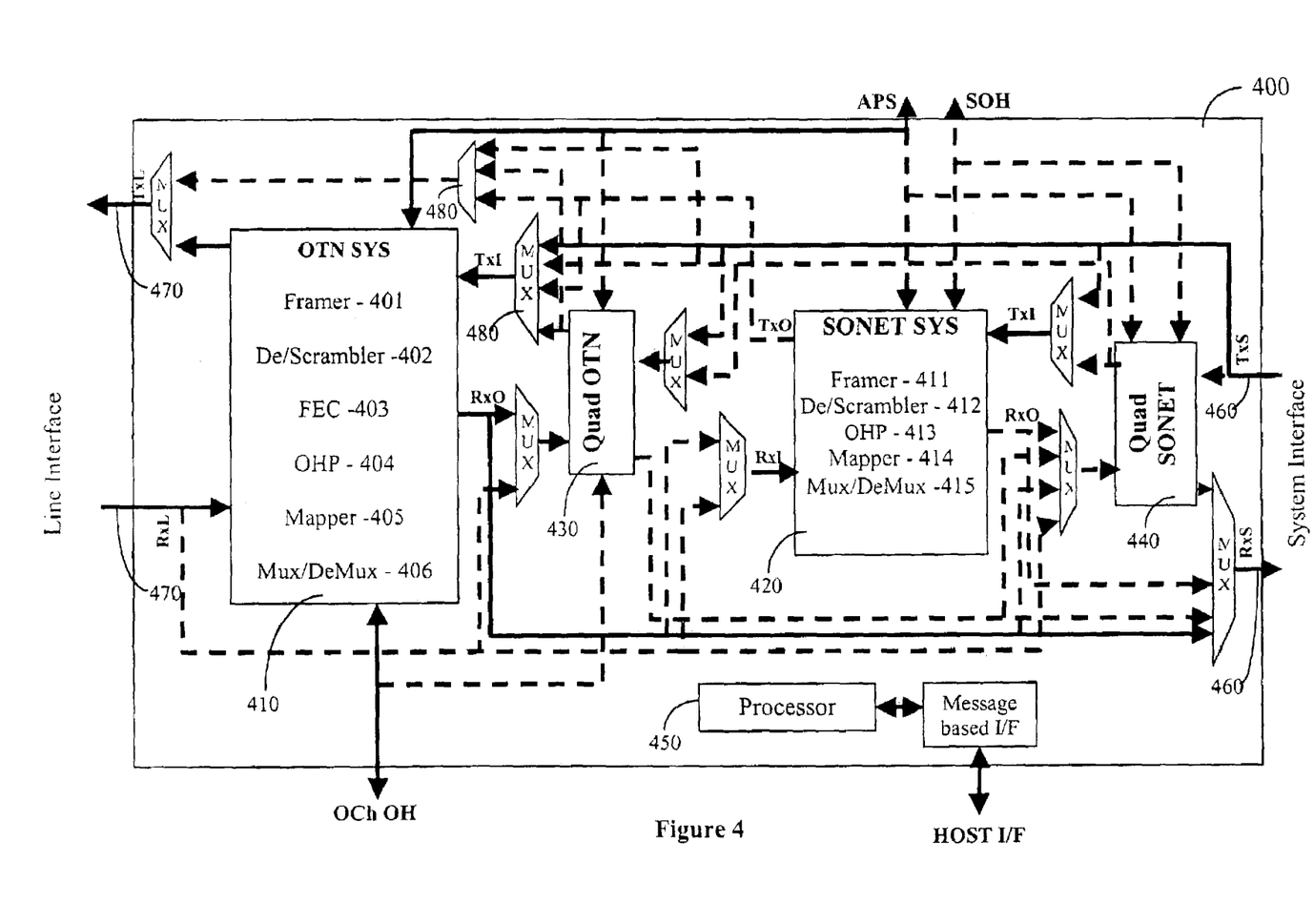
FIG. 4 is an illustration of the integrated architecture configuration for OTN OTU-3 data flow, according to the present invention.

Reference is now made to FIG. 4, where an example of an integrated architecture 400 is shown, configured to process OTN OTU3 signals. In this configuration, internal multiplexers 480 are set to allow data flow from line interface 470 and system interface 460 to OTN SYS 410. Namely, data flows from line interface 470 to system interface 460 and vice versa.

Data Flow from Line Interface 470 to System Interface 460
The signal received from line interface 470, configured as SFI-5 interface or 64 lines of 672 Mbps signals, is passed to OTN SYS 410 for processing. OTN SYS 410 traces the framing signal. In parallel, the generic AIS pattern signal is searched for. The generic AIS signal replaces the OTU signal to inform of failures during the transmission. When the framing signal is detected a process for byte alignment is performed. The byte alignment is used as part of the framing process to allow parallel processing of bytes. In the case where a generic AIS signal is detected, an indication is generated downstream to the alarm hierarchy and consequent action module. Once frame and byte alignment are achieved, the signal received may be descrambled. The descrambled signal is then transferred to the FEC block 403.

The FEC block 403 attempts to correct the erroneous bits in a received frame. The FEC is performed through the implementation of a Reed Solomon algorithm RS (255,239). The FEC block 403 may be configured for correcting the erroneous bits or to monitor and/or count the errors received. After correcting the errors, the data contained in the frame is transferred to the OHP block 404 for the OTN OTU3/ODU3/OPU3 (i.e., OTU/ODU/OPU in OTU3) overhead handling.

The processing of OTN OTU3/ODU3/OPU3 overhead may result in alarms or faults detection, performance monitoring actions, tandem connection monitoring and/or communication channels extraction. The detection of ODU-AIS, ODU-OCI or ODU-LCK signals is also performed. The alarms and faults detection may be configured to propagate downstream, towards system interface 460, or to notify processor 450. Processor 450 may be configured to provide notification to the HOST The alarm/faults hierarchy suppression is also performed if so configured. In this case, only the high order alarms/faults are notified and lower order alarms/faults are suppressed. For example, in case of a generic AIS detection, all lower order alarms such as LOF and SM signal degrade are suppressed and the only active alarm is GAIS (generic AIS). This is done in order to reduce the number of messages, reports, events, faults, or alarms sent to the equipment's management system. The equipment management system is a communication device that controls the configuration and functionality of integrated architecture 400.

The payload area of the received signal may be configured as TDM or data. Data type application (e.g., IP, ATM, GFP, 1GBE and 10GBE) payloads are sent to the mapper block 405. TDM payloads are sent to the mux/demux block 406 or to system interface 460.

The mapper block 405, using data engines to extract the data information from the OPU3 encapsulation (e.g., ATM)

and insert it into an output buffer. From the output buffer the data is sent to system interface 460 configured as SPI-5 interface.

The mux/demux block 406 is used for demultiplexing the TDM payload from OTU3 to quad OTU2 or to quad OC-192/STM-64. Optionally, the data stream may be scrambled to offer connection via a fiber optics line to a switching fabric or an optical cross-connect. The scrambled signal is then sent to system interface 460 for further processing and distribution within the communication system (e.g., optical crossconnect). In this case, system interface 460 may be configured as SFI-5 or 64 lines of 622–672 Mbps with or without a frame synchronization indicator. Signals that are not multiplexed are sent directly to system interface 460.

The received overhead bytes are optionally extracted for additional proprietary processing. The information required for protection switching is extracted from the device to be connected to mate device for 1+1, 1:1 and 1:N protection schemes.

Data Flow from System Interface 460 to Line Interface 470

The input signal from system interface 460, depends on whether the payload type is configured as TDM or data. For data type applications, system interface 460 is configured as SPI-5. The data is passed over the SPI-5 interface to the mapper block 405 for rate adaptation and data encapsulation. The mapper block 405 adapts the rate of the input signal to a rate of 40 Gbits/sec by using a data buffer. In addition, the mapper block 405 encapsulates the data information into the OPU3 payload area (e.g. ATM) by using a data engine. The payload data OPU3 is then passed to the OHP block 404 for OTU/ODU/OPU overhead insertion.

For TDM payload configuration, system interface 460 is configured as SFI-5 or 64 lines of 672 Mbps signals with or without frame synchronization indicator. Signals from the 64 lines of 672 Mbps interfaces may be descrambled. Signals from SFI-5 interface are framed and aligned by means of framer block 401. The framed and byte aligned signals may also be descrambled. The descrambled data is then transferred to the FEC block 403. The FEC block 403 attempts to correct the erroneous bits in the frame. In addition, the SM fields are checked for mismatch, errors and performance monitoring. The processed and monitor signal is then passed to the OHP block 404.

OHP block 404 constructs the OTN OTU/ODU/OPU overhead. In addition, the framing and multiframe bytes are generated and inserted into the OTU/ODU/OPU overhead with alarm/faults generation, performance monitoring actions, and others. The alarms and faults generation may be configured to propagate upstream, towards line interface 470, including alarms such as ODU-AIS, ODU-OCI or ODU-LCK signals. After completing the overhead generation the signal data is passed to the FEC block 403.

The FEC block 403 is optionally operated or bypassed. The FEC is based on a Reed Solomon algorithm RS (255, 239). The FEC block 403 performs the RS algorithm on the data stream and the redundancy bytes are inserted. If the FEC block 403 is configured to operate according to a "bypass mode", then the redundancy bytes are all inserted as zeros. The frame data is then transferred to the scrambler block 402.

When OTN SYS 410 completes the frame building, the OTN frame is optionally scrambled. The scrambled frame is then transmitted through line interface 470, via SFI-5 interface or 64 lines of 672 Mbps signals (total of 43 Gbps). If processor 450, HOST, or the alarm hierarchy detects a major fault, the generic AIS signal is transmitted instead of the data received through system interface 460. The transmitted overhead bytes are optionally inserted from an external processing device, such as field programmable gate array (FPGA) or application specific integrated circuit (ASIC). These devices can process messages that are passed over the overhead bytes, and detect patterns potentially indicating vendor proprietary information. The required information for switching protection is inserted from the external device via the APS port, and may include 1+1, 1:1 and 1:N protection schemes.

SONET/SDH OC-768/STM-256 into OTN OTU3 Data Flow

Figure 5:
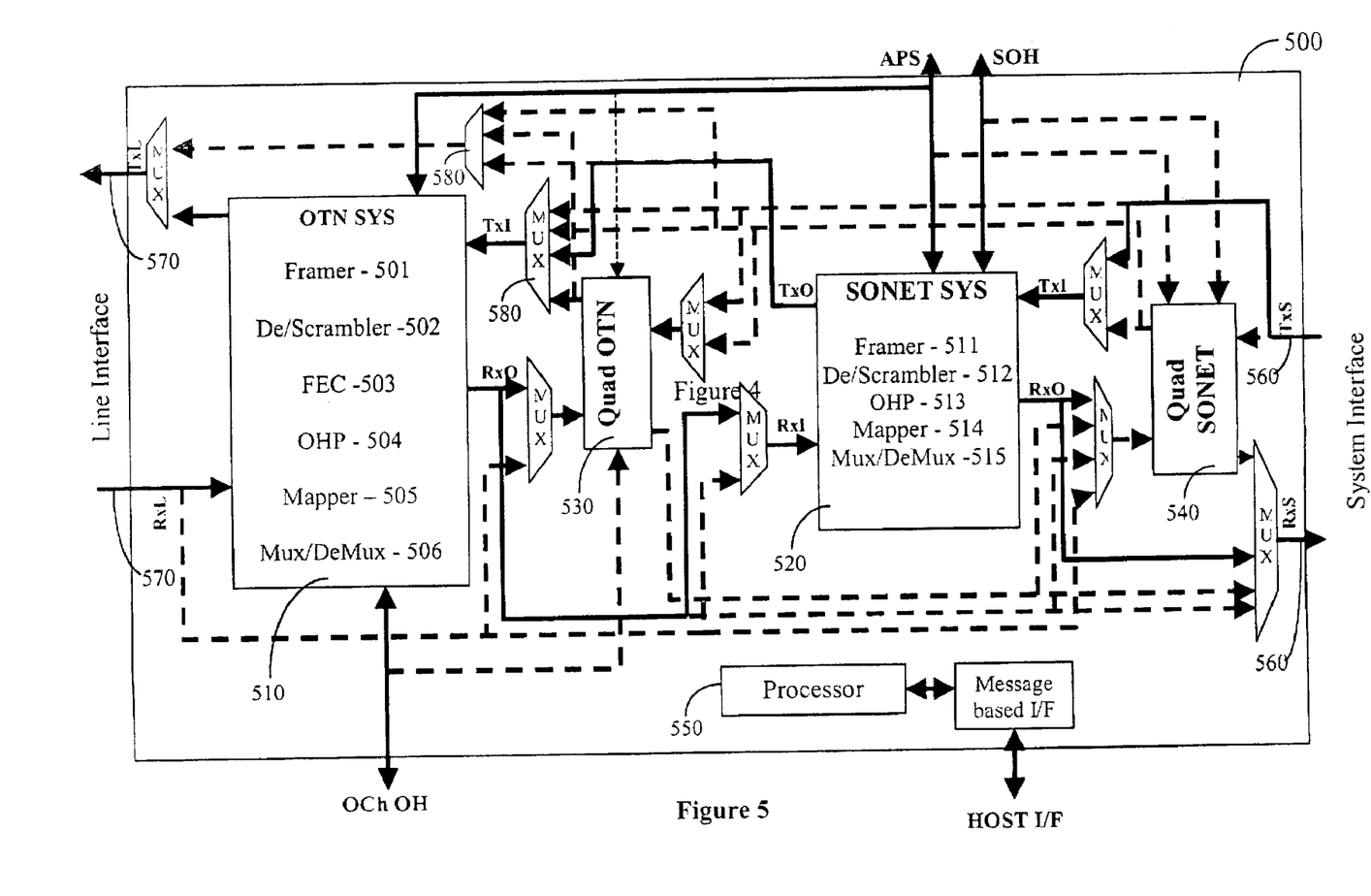
FIG. 5 is an illustration of the integrated architecture configuration for SONET/SDH OC-768/STM-256 mapping into OTN OTU3 data flow, according to the present invention.

Reference is now made to FIG. 5 illustrating an example of an integrated architecture 500 configured for SONET/SDH OC-768/STM-256 mapped into OTN OTU3 processing. In this configuration the internal multiplexors 580 are set to allow data flow from line interfaces 570 and system interface 560 to the SONET SYS 520 and OTN SYS 510. In other words, this configuration is used for the purpose of adapting SONET/SDH OC-768/STM-256 signals to OTN OUT3 signals.

Data Flow from Line Interface 570 to System Interface 560

The signal received from line interface 570 is connected directly to OTN SYS 510 for processing. The processing includes the following stages: frame alignment, scrambling, FEC, and overhead processing. All of these stages were described above in detail. Following are details of the respective data flow.

In order to adapt the signal received, i.e., adapting an OTN frame to a SONET frame, the signal is transferred to the mapper block 505 within OTN SYS 510. The mapper block 505 is used for extracting the SONET/SDH OC-768/STM-256 data from OPU3, namely performing the operation of demapping. This data is embedded in the OTN frame. The demapping technique may be asynchronous if OC-768/STM-256 data is not frequency locked with OTU3 frequency, i.e. OC-768/STM-256 is not frequency locked to the OTU3 frequency by ratio of 236/255. In this case, the mapping information within the OPU3 overhead is used to regenerate the original OC-768/STM-256 frequency. A synchronous mapping is performed if the OC-768/STM-256 is frequency locked with the OTU3 signals.

The extracted OC-768/STM-256 data is then passed to SONET SYS 520 for processing. First, SONET SYS 520 searches for the framing signal in the OC-768/STM-256 data. When the framing signal is detected a process for byte alignment is performed. The byte alignment is used as part of the framing process to allow processing on a byte granularity. Next, when frame and byte alignment are achieved the signal is optionally descrambled. The descrambled data is then transferred to the overhead processor (OHP) for the SONET/SDH section and line overhead handling.

The processing of the SONET/SDH section and line overheads results in alarm and fault detections, performance monitoring actions, and communication channels extraction. The alarms and faults detection may be configured to propagate downstream (towards system interface 560) or for notification of processor 550. In some cases processor 550 will notify the HOST.

In addition, the SONET/SDH pointers and path overheads are processed. The processing results in alarm/faults detections, performance monitoring actions, and user channels extraction. The alarms and faults detection may be configured to propagate downstream (towards system interface 560), or for notification of the internal embedded processor. The internal embedded processor will notify the HOST if configured so. In case of TDM payload, all pointer processors and path overheads are processed down to STS-1 for SONET OC-768 and VC-3 for SDH STM-256. Any valid combination is also supported. For example two STS-192c and two STS-192.

The payload area may be configured as TDM or data. Data type application payloads are sent to the mapper block 514 within SONET SYS 520. TDM payloads are sent to the mux/demux block 515 within SONET SYS 520 or to system interface 560.

The mapper block 514 extracts the data information from the encapsulated payload (e.g., POS for IP packets) by using data engines. It then inserts the data into the output buffer. From the output buffer the data is sent to system interface 560 configured as SPI-5 interface.

The mux/demux block 515 is used for multiplexing the TDM payload from quad OC-192/STM-64 to OC-768/STM-256. Optionally, the data stream may be scrambled to offer connection via a fiber optics line to a switching fabric, or an optical cross-connect. The signal is then connected to system interface 560 for further processing and distribution within the communication system (e.g., optical cross-connect). In this case, system interface 560 may be configured as SFI-5 or 64 lines of 622 Mbps signals with or without a frame synchronization indicator for the case of OC-768/STM-256 or quad SFI-4 for quad OC-192/STM-64.

Data Flow from System Interface 560 to Line Interface 570

The input signal is connected to the SONET SYS 520 for processing. Input signals with payloads are configured as data type application, and are sent to the mapper block 514, while payloads configured as TDM are sent to the mux/demux 515 block for quad OC-192/STM-64 processing. The mapper 514 and the mux/demux block 515 are part of SONET SYS 520.

For data type applications such as IP, ATM, GFP, 1GBE and 10GBE, system interface 560 is configured as SPI-5. The data is passed over the SPI-5 interface to the mapper block 514 for rate adaptation and data encapsulation. The mapper block 514 adapts the rate of the input signal to a rate of 40 Gbits/sec by using a data buffer. The mapper block 514 encapsulates the data information into the SONET/SDH payload area (e.g. POS for IP packets) by using a data engine. The payload data is then passed to the OHP block 513 for pointer processing and path overhead section insertion.

For TDM payload configurations, system interface 560 is configured as SFI-5 or 64 lines of 622 Mbps signals with or without a frame synchronization indicator. Signals from the 64 lines of 622 Mbps interfaces may be descrambled and then sent directly to the OHP block 513. Signals from SFI-5 interface are framed and aligned by means of the framer block 511. The framed and byte aligned signals may be then descrambled. The descrambled data is then monitored for tracing information (i.e., J0-section trace), as well as line and section performance monitoring. The performance monitoring results are reported to the HOST via processor 550. The signal is then connected to the OHP block 513 to add the SONET/SDH path overhead, pointer processing, as well as line and section overheads.

The processed SONET/SDH OC-768/STM-256 signal is passed to the mapper block 505 of the OTN SYS 510 for the mapping process. The mapping of OC-768/STM-256 into the OPU can be asynchronous, in which case the OC-768/STM-256 is not locked to the OTU3 frequency. Namely, tile OC-768/STM-256 is not frequency locked to the OTU3 frequency by ratio of 236/255. In this case the frequency synchronization between the both signals is required. This information is inserted into the OPU3 overhead.

The complete OTN frame is then sent to line interface 570 configured as SFI-5 interface or 64 lines of 672 Mbps signals.

Quad OC-192/STM-64 into Quad OTU2 Data Flow

Figure 6:
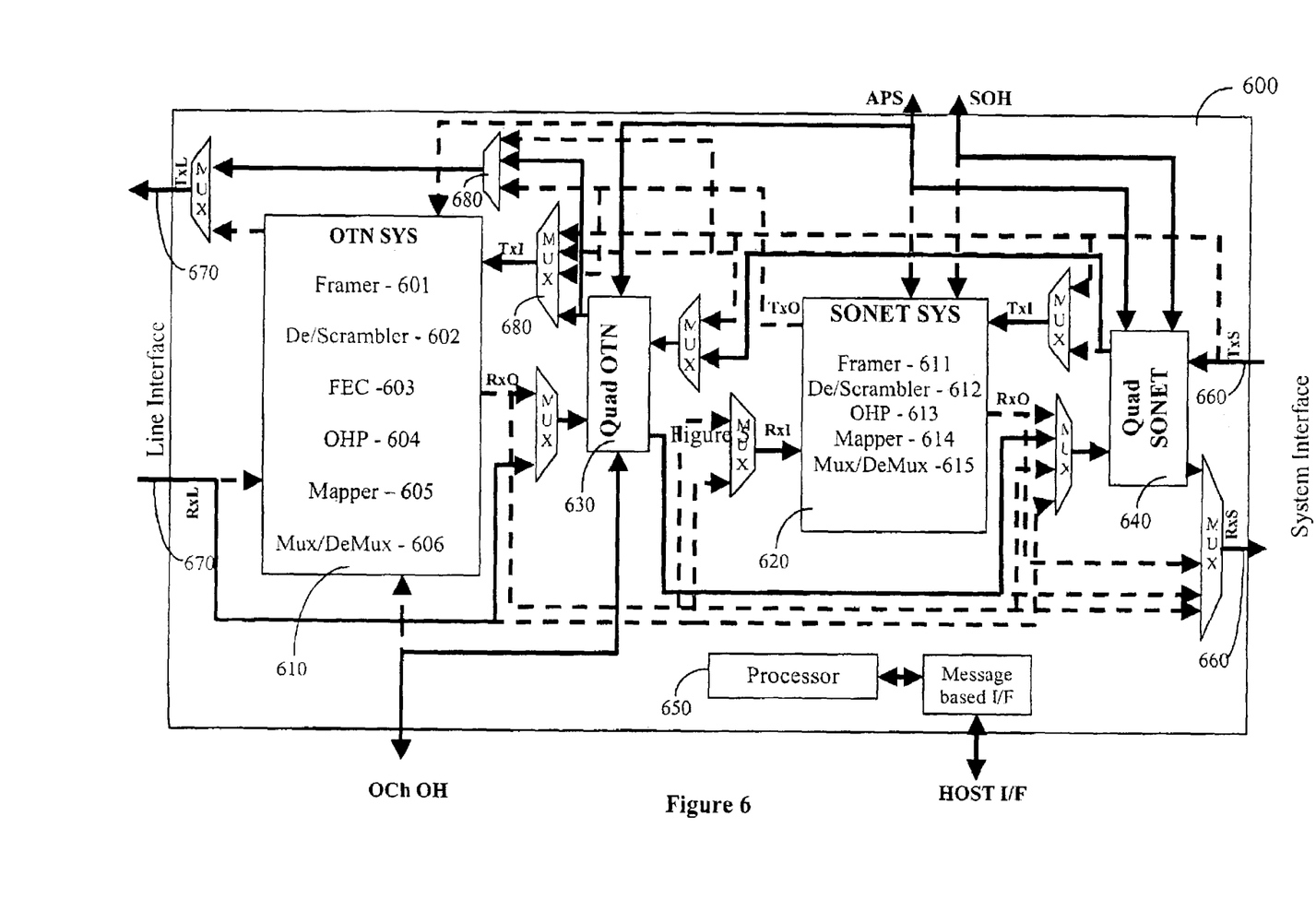
FIG. 6 is an illustration the integrated architecture configuration for Quad SONET/SDH OC-192/STM T-64 mapping into Quad OTN OTU2 data flow, according to the present invention.

Reference is now made to FIG. 6, which illustrates an example of an integrated architecture 600 configured to Quad channels of OC-192/STM-64 mapped into OTU2 signals. Here, multiplexors 680 are set to allow data flow from line interface 670 to system interface 660 to Quad OTU2 630 block and Quad SONET 640. The integrated architecture implements four independent channels of OC-192/STM-64 and OTU2.

Data Flow from Line Interface 670 to System Interface 660

Quad OTN 630 receives tour independent OTU2 signals from line interface 670. In this case, line interface 670 is configured as SFI-4 interface or 16 lines of 672 Mbps signals.

For each OTU2 signal, quad OTN 630 searches for the framing signal. In parallel, the generic AIS pattern signal is searched. When the framing signal is detected a process for byte alignment is performed. The byte alignment is used as part of the framing process to allow parallel processing of bytes. The generic AIS detector operates in parallel to the detection of this signal. If the generic AIS signal is detected, an indication is generated downstream, specifically to the alarm hierarchy and consequent action module.

When frame and byte alignment is achieved, the signal is descrambled. The descrambled data is transferred to the FEC block 603. The FEC block 603 is used for correcting the erroneous bits, monitoring, and counting the errors. After correcting the errors, the data from the frame is transferred to the OHP block 604, for the purpose of OTN OTU2/ODU2/OPU2 overhead handling.

The OTN OTU2/ODU2/OPU2 overheads processing results in alarm/fault detections, performance monitoring actions, and tandem connection monitoring and communication channels extraction. The detection of ODU-AIS, ODU-OCI or ODU-LCK signals is also performed.

Subsequently, the processed OTU2 signal is passed to the mapper block 605. The mapper block 605 extracts the OC-192/STM-64 signals from the OPU2 frame. The OC-192/STM-64 signal may he asynchronous or synchronous mapped into the OPU2. The extracted OC-192/STM-64 signals are sent to quad SONET 640. The quad SONET 640 searches for the framing signal. When the framing signal is detected a process for byte alignment is performed. The byte alignment is used as part of the framing process to allow processing on byte granularity. When frame and byte alignment are completed, the signal is transferred to the OHP block 613 for the OC-192/STM-64 SONET/SDH section and line overhead handling.

The OC-192/STM-64 SONET/SDH section and line overhead processing results in alarm/fault detections, performance monitoring actions, and communication channels extraction. The alarms and faults detection may be configured to propagate downstream (towards system interface 660) or to notify the processor 650. Processor 650 notifies the HOST if so configured. In addition, the OC-192/STM-64 SONET/SDH pointers and path overheads are processed.

Depending on the payload type being configured as TDM or Data, the data path is connected to, either the mapper block 614, the de/scrambler block 612, or the system interface 660. For data type applications, the payload is passed to the data engine for processing. The data engine extracts the data information from the encapsulated payload (e.g., POS for IP packets) and inserts it into the output buffer. From the output buffer the data is transferred to system interface 660, which is configured as a quad SPI-4/PLI-4 interface.

For TDM payload, the processed signal may be scrambled to offer connection via fiber optics line to a switching fabric, an optical cross-connect, or the network. The signal is sent to the system interface 660 for further processing and distribution within the communication system (e.g., optical cross-connect). For TDM payload, the system interface 660 may be configured as SFI-4 or 16 lines of 622 Mbps signals with or without a frame synchronization indicator.

The overhead bytes received are optionally extracted for additional processing. The information required for protection switching is extracted from the device to be connected to an external device via APS port for 1+1, 1:1 and 1:N protection schemes.

The four OTU2 and OC-192/STM-64 signals are independent, thus each of them can have either TDM or Data payloads.

Data Flow from System Interface 660 to Line Interface 670

The four input signals (OC-192/STM-64) from the system interface 660 are connected to the quad SONET 640 for processing. For data type applications (e.g., IP, ATM, GFP, 1GBE and 10GBE), the system interface 660 is configured as SPI-4/PLI-4 for each OC-192/STM-64 signal (four separate interfaces). The data is transferred over the SPI-4/PLI-4 interface to the data buffer for rate adaptation. From the data buffer, the data is moved to the data engine for processing. The data engine encapsulates the data information into the SONET/SDH payload area (e.g., POS for IP packets). If the data buffer is empty, the data engine inserts idle data into the payload area. The payload data is then passed to the OHP block 613 for pointer processing and path overhead section insertion.

For TDM payload configuration, system interface 660 is configured as SFI-4 or 16 lines of 622 Mbps signals with or without a frame synchronization indicator, for OC-192/STM-64 signal. The configuration of system interface 660 is fully programmable to allow any combination between SFI-4 and 16 lines of 622 Mbps signals with or without a frame synchronization indicator. The OC-192/STM-64 signal is processed for frame and byte alignment. The framed and byte aligned signal may be then descrambled. The descrambled data is monitored for trace information and section performance monitoring. The performance monitoring results are reported to the HOST via processor 650.

Subsequently, the signal is passed to the OHP 613 to add the SONET/SDH OC-192/STM-64 path overhead, pointer processing, as well as section and line overheads. The OC-192/STM-64 signal is then sent to quad OTN 630. Quad OTN 630 maps the OC-192/STM-64 signal into the OPU2 frame. The mapping may be asynchronous or synchronous. If each of the OC-192/STM-64 has different frequency, an asynchronous mapping maybe used or each OTU2 can be synchronous to the OC-192/STM-64 with separate clock. If all OC-192/STM-64 signals are frequency locked to the OTU2 frequency by a ratio of 237/255, a synchronous mapping maybe used. After mapping, the signals are transmitted towards the line interface 670 via SFI-4 interface or 16 lines of 672 Mbps signals.

The invention described herein teaches how to configure the disclosed integrated architecture 300, 400, 500, and 600 so as to achieve OTN OTU-3, SONET/SDH OC-768/STM-256 into OTN OTU3, and quad SONET/SDH OC-192/STM-64 into quad OTN OTU2 data flows. However, a person skilled in the art can easily configure the provided architecture to process all of the above-mentioned data flows, as well as any other combinations of data flows.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. An integrated network device for enabling efficient data flows between a synchronous optical network (SONET) and an optical transport network (OTN) comprising:
 a. a SONET system (SYS) component coupled to the SONET and capable of mapping OC-768 data flows to OTU3 data flows; and
 b. an OTN SYS component coupled to the OTN and the SONET SYS and capable of mapping OTU3 data flows to OC-768 data flows.

2. The integrated network device of claim 1, wherein the OC-768 data flows include SONET data flows having a rate of at least forty Giga bits per second.

3. The integrated network device of claim 1, wherein the OTU3 data flows include OTN data flows having a rate of at least forty Giga bits per second.

4. The integrated network device of claim 1, wherein the SONET SYS component is connected to the SONET through a system interface.

5. The integrated network device of claim 1, wherein the OTN SYS component is connected to the OTN through a line interface.

6. The integrated network device of claim 1, wherein the OC-768 and OTU3 data flows include flows consisting of data packets, time-division multiplexing signals and a combination thereof.

7. The integrated network device of claim 1, wherein the OTN SYS component further includes:
 1. a framer for performing frame alignment on incoming frames of the OTU3 data flows;
 ii. a scrambler/descrambler for scrambling and descrambling the OTU3 frames;
 iii. a forward error correction component for enabling error correction of the OTU3 data;
 iv. an overhead processing component for processing OTU3 frames overhead data; and
 v. a mapper for enabling mapping the OTU3 OTN frames to SONET frames compliant with OC-768 data flows.

8. The integrated network device of claim 1, wherein the SONET SYS component further includes:
 1. a framer for performing frame alignment on incoming OC-768 frames of the OC-768 data flows;
 ii. a scrambler/descrambler for scrambling and descrambling the OC-768 frames;
 iii. an overhead processing component for processing frame overhead and frame pointer data of the OC-768 data flows; and
 iv. a mapper for enabling mapping OC-768 SONET frames to OTN frames compliant with said OTU3 data flows.

9. An integrated network device for enabling efficient data flows between a digital hierarchy (SDH) network and an optical transport network (OTN) comprising:

a. a SONET system (SYS) component coupled to the SDH network and capable of mapping STM-256 data flows to OTU3 data flows; and b. an OTN SYS coupled to the OTN and the SONET SYS and capable of mapping OTU3 data flows to STM-256 data flows.

10. The integrated network device of claim 9, wherein the STM-256 data flows include SONET data flows having a rate of at least forty Giga bits per second.

11. The integrated network device of claim 9, wherein the OTU3 data flows include OTN data flows having a rate of at least forty Giga bits per second.

12. The integrated network device of claim 9, wherein the SONET SYS component is connected to the SONET through a system interface.

13. The integrated network device of claim 9, wherein the OTN SYS component is connected to the OTN through a line interface.

14. The integrated network device of claim 9, wherein the OC-768 and OTU3 data flows include flows consisting of data packets, time-division multiplexing signals and a combination thereof.

15. The integrated network device of claim 9, wherein the OTN SYS component further includes:

i. a framer for performing frame alignment on incoming OTU3 frames of the OTU3 data flows;

ii. a scrambler/descrambler for scrambling and descrambling the OTU3 frames;

iii. a forward error correction component for enabling error correction of the OTU3 frames;

iv. an overhead processing component for processing OTU3 frames overhead data; and v. a mapper for enabling mapping OTU3 frames to SDH frames compliant with STM-256 data flows.

16. The integrated network device of claim 1, wherein the SONET SYS component further includes:

i. a framer for performing frame alignment on incoming STM-256 frames of the STM-256 data flows;

ii. a scrambler/descrambler for scrambling and descrambling the STM-256 frames;

iii. an overhead processing component for processing frame overhead and frame pointer data of the STM-256 data flows; and iv. a mapper for enabling mapping the STM-256 frames to OTN frames compliant with said OTU3 data flows.

17. A method for enabling effective data flows between an optical transport network (OTN) and a synchronous optical network (SONET) comprising the steps of:

a. receiving 0TU3 data flows from the OTN;

b. processing the OTU3 data flows to obtain processed OTU3 data flows;

c. mapping the processed OTU3 data flows to OC-768 data flows; and d. processing the OC-768 data flows to obtain processed OC-768 data flows.

18. The method of claim 17, further comprising the step of:

e. transmitting the processed OC-768 data flows to the SONET.

19. The method of claim 17, wherein the step of mapping the processed OTU3 data flows to OC-768 data flows includes mapping OTU3 data flows to OC-768 SONET data flows having a rate of at least forty Giga bits per second.

20. The method of claim 17, wherein the steps of receiving and processing OTU3 data flows includes receiving and processing OTN data flows having a rate of at least forty Giga bits per second.

21. The method of claim 17, wherein the step of processing the OTU3 data flows includes:

i. performing frame alignment on OTN frames of the OTU3 data flows;

ii. scrambling and descrambling the OTN frames;

iii. performing forward error detection on the scrambled/descrambled OTN frames; and iv. processing information encapsulated in overheads of the OTN frames.

22. The method of claim 17, wherein the step of mapping the processed OTU3 data flows to OC-768 data flows includes:

i. performing rate adaptation on OTN frames of the OTU3 data flows; and ii. extracting OC-768 data information from an encapsulated payload of the OTN frames.

23. The method of claim 17, wherein the SONET includes a synchronous digital hierarchy (SDH) network.

24. The method of claim 17, wherein the OC-768 data flows include STM-256 data flows.

25. A method for enabling effective data flow between a synchronous optical network (SONET) and an optical transport network (OTN) comprising the steps of:

a. receiving OC-768 data flows from the SONET;

b. processing the OC-768 data flows to obtain processed OC-768 data flows;

c. mapping the processed; OC-768 data flows to OTU3 data flows; and d. processing the OTU3 data flows to obtain processed OTU3 data flows.

26. The method of claim 25, further comprising the step of:

e. transmitting the processed OTU3 data flows to the OTN.

27. The method of claim 26, wherein the step of mapping the processed OC-768 data flows to OTU3 data flows includes mapping OC-768 data flows to OTU3 data flows having a rate of at least forty Giga bits per second.

28. The method of claim 27, wherein the steps of receiving and processing OC-768 data flows includes receiving and processing OC-768 SONET data flows having a rate of at least forty Giga bits per second.

29. The method of claim 26, wherein the step of processing the OC-768 data flows to obtain processed OC-768 data flows includes:

i. performing frame alignment on SONET frames of said OC-768 data flows;

ii. scrambling and descrambling said SONET frames; and iii. processing information and pointer data encapsulated in overheads of the scrambled/descrambled SONET frames.

30. The method of claim 26, wherein the SONET includes a synchronous digital hierarchy (SDH) network.

31. The method of claim 26, wherein the OC-768 data flows include STM-256 data flows.

* * * * *